(12) United States Patent
Tada et al.

(10) Patent No.: US 9,426,348 B2
(45) Date of Patent: Aug. 23, 2016

(54) AUTOFOCUS CAMERA FOR ADJUSTING TILT IN THE OPTICAL AXIS OF A LENS, AND CAMERA-EQUIPPED ELECTRONIC DEVICE

(71) Applicant: New Shicoh Technology Co., Ltd., Yamato (JP)

(72) Inventors: Junichi Tada, Yamato (JP); Hiroshi Sato, Yamato (JP); Manabu Shiraki, Yamato (JP)

(73) Assignee: New Shicoh Technology Co., Ltd., Kanagawa Pref. (JP)

( * ) Notice: Subject to any disclaimer, the term of this patent is extended or adjusted under 35 U.S.C. 154(b) by 0 days.

(21) Appl. No.: 14/285,940

(22) Filed: May 23, 2014

(65) Prior Publication Data

US 2014/0347551 A1    Nov. 27, 2014

(30) Foreign Application Priority Data

May 27, 2013   (JP) .................................. 2013-110803

(51) Int. Cl.
| | |
|---|---|
| *H04N 5/225* | (2006.01) |
| *H04N 3/14* | (2006.01) |
| *H04N 5/232* | (2006.01) |
| *G02B 27/00* | (2006.01) |
| *G03B 17/18* | (2006.01) |

(52) U.S. Cl.
CPC ........ *H04N 5/23212* (2013.01); *G02B 27/0025* (2013.01); *G02B 27/0068* (2013.01); *H04N 5/2254* (2013.01); *G03B 17/18* (2013.01); *G03B 2205/0023* (2013.01); *G03B 2205/0046* (2013.01); *G03B 2205/0069* (2013.01)

(58) Field of Classification Search
CPC .............. G02B 7/28; G02B 7/09; G02B 7/36; G02B 27/0068; G02B 27/0025; H04N 5/232; H04N 5/225; H04N 5/23212; H04N 5/2254; G03B 5/02; G03B 5/04; G03B 17/18; G03B 2205/0023; G03B 2205/0046; G03B 2205/0069
USPC .................................. 348/345–375, 340, 335
See application file for complete search history.

(56) References Cited

U.S. PATENT DOCUMENTS

| | | | |
|---|---|---|---|
| 2007/0189765 A1* | 8/2007 | Schulte ......................... | 396/529 |
| 2011/0039599 A1* | 2/2011 | Shiraki ................... | G02B 7/08 455/556.1 |
| 2012/0307089 A1* | 12/2012 | Rukes ...................... | 348/208.99 |

FOREIGN PATENT DOCUMENTS

| | | |
|---|---|---|
| JP | 2011-069867 | 4/2011 |
| WO | WO 2011/021502 A1 | 2/2011 |

*Primary Examiner* — Sinh Tran
*Assistant Examiner* — Selam T Gebriel
(74) *Attorney, Agent, or Firm* — Buchanan Ingersoll & Rooney PC

(57) ABSTRACT

An autofocus camera is provided which restrains and corrects any tilt that may occur in the optical axis direction without the need of providing any additional new sensors for that purpose. The autofocus camera includes an image sensor for receiving light from an object and converting the light into corresponding electrical signals, a lens driving device having a lens for focusing the light from the object upon said image sensor, and a control portion for causing said lens driving device to adjust any tilt that may occur in the optical axis in response to the electrical signals received from said image sensor. The control portion is operated to cause the lens driving device to adjust any tilts of the optical axis with respect to the image sensor in the orthogonal directions with each other, so that the resolution signals at the predetermined positions of said image sensor can be maximized.

6 Claims, 10 Drawing Sheets

(a)

(b)

(c)

AUTOFOCUS CAMERA FOR ADJUSTING TILT IN THE OPTICAL AXIS OF A LENS, AND CAMERA-EQUIPPED ELECTRONIC DEVICE

BACKGROUND OF THE INVENTION

1. Field of the Invention

The present invention relates to an autofocus camera mounted on an electronic device such as mobile phones and the like, and a camera-equipped electronic device.

2. Description of Relevant Art

For the conventional autofocus camera, there is an important problem in that any tilt that may occur in the camera's optical axis must be restrained and corrected in order to meet the needs of achieving the high picture elements and the like.

There have been various proposals that attempt to solve the above problem. In Patent Document 1, for example, it is proposed that the sensor that detects any tilt that may occur in the optical axis of the lens is to be attached to a lens support. The sensor attached to the lens support is so designed that any tilt that may occur in the optical axis can be restrained and corrected on the realtime basis by allowing it to detect any tilt of the lens support.

Patent Document 1: WO2011/021502A1

SUMMARY

The structure proposed by Patent Document 1 requires that any additional new sensors and wires are to be added. This presents a problem in that the lens driving device must be made smaller.

In light of the above problem, the object of the present invention is to provide an autofocus camera that is capable of restraining and correcting any tilt and a camera-equipped electronic device without the needs of adding any additional new sensors.

The invention according to claim 1 provides an autofocus camera comprising:

an image sensor for receiving light from an object and converting the light into corresponding electrical signals;

a lens driving device having a lens for focusing the light from the object upon said image sensor; and a control portion for causing said lens driving device to adjust any tilt that may occur in the optical axis in response to the electrical signals received from said image sensor, wherein said control portion is operated to cause said lens driving device to adjust any tilts of the optical axis with respect to the image sensor in the orthogonal directions with each other, so that the resolution signals at the predetermined positions of said image sensor can be maximized.

The invention according to Claim 2 provides the autofocus camera as defined in Claim 1, wherein said resolution signals are derived from either of the center area of said image sensor and the peripheral areas of said image sensor.

The invention according to Claim 3 provides the autofocus camera as defined in Claim 1, wherein said control portion is operated to determine an average value obtained by averaging said resolution signals obtained at more than one point of said image sensor and adjust any tilts of the optical axis with respect to the image sensor in the orthogonal directions with each other, so that said average value can be maximized.

The invention according to Claim 4 provides an electronic device on which the autofocus camera as defined in any one of Claims 1 through 3 is mounted.

As one advantage of the present invention, it can provide an autofocus camera that is capable of restraining and correcting any tilt and a camera-equipped electronic device without the needs of adding any additional new sensors.

BEST MODES OF EMBODYING THE INVENTION

The present invention can be applied to the autofocus camera that may be incorporated in the lens driving device.

By referring first to FIG. 2 through FIG. 4 in the accompanying drawings, one example of the lens driving device that is employed in the camera of the present invention will be described.

Figure 2:
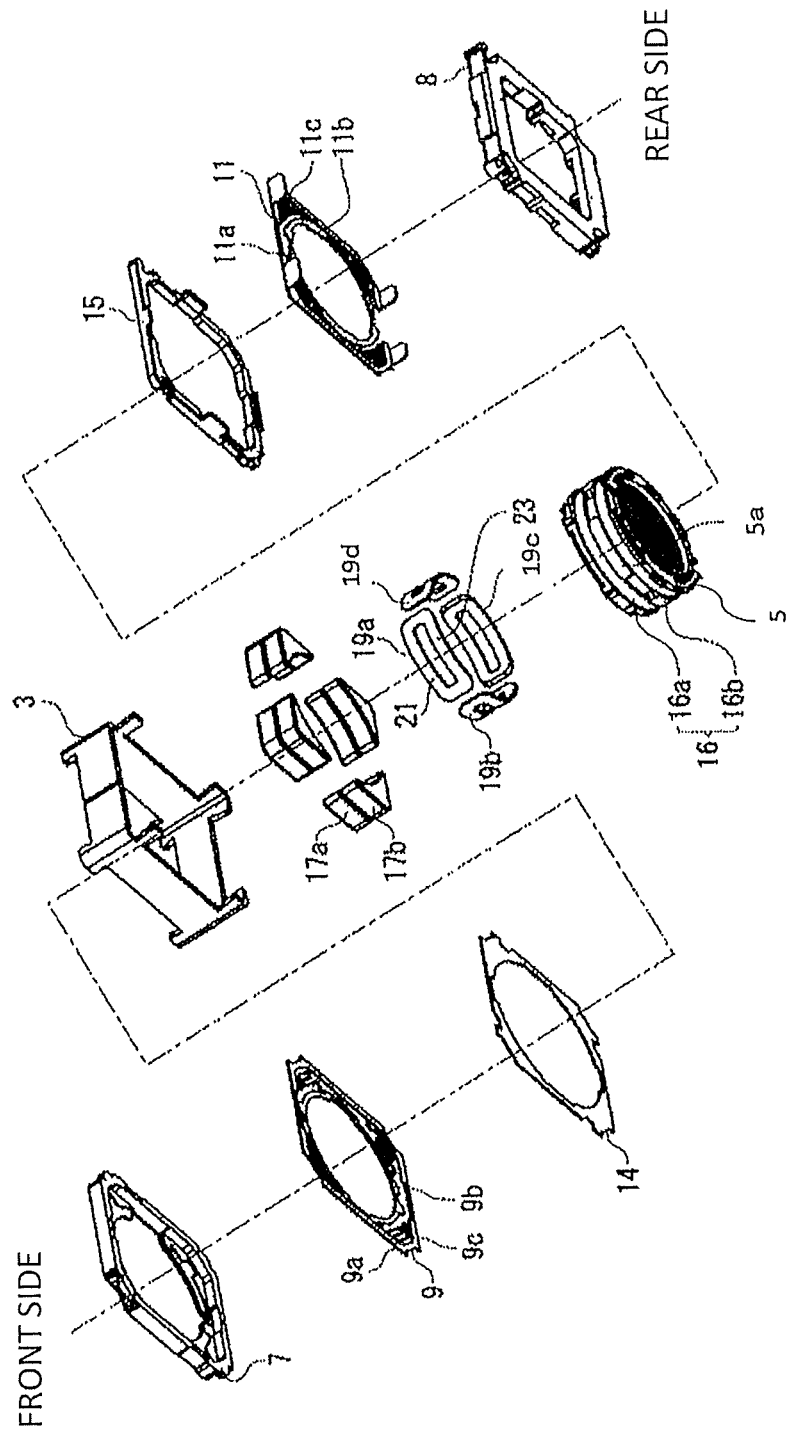
FIG. 2 is an exploded perspective view of one form of the lens driving device employed in the camera of an embodiment of the present invention.
Figure 3:
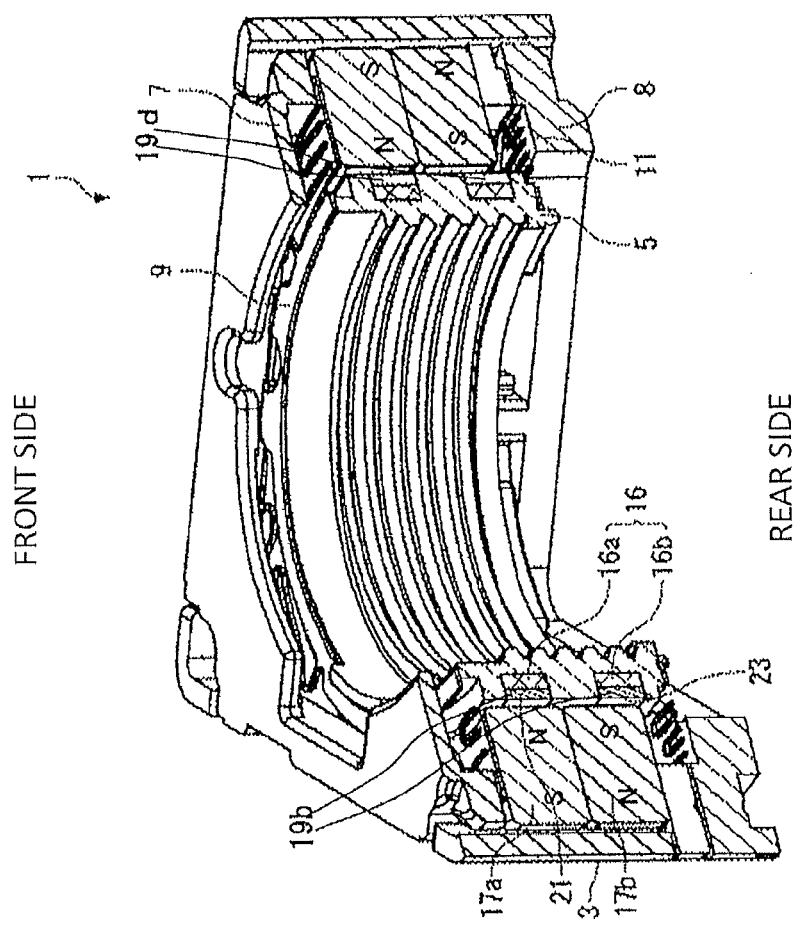
FIG. 3 is a partly cross-sectional perspective view of the one form of the lens driving device employed in the camera of an embodiment of the present invention.
Figure 4:
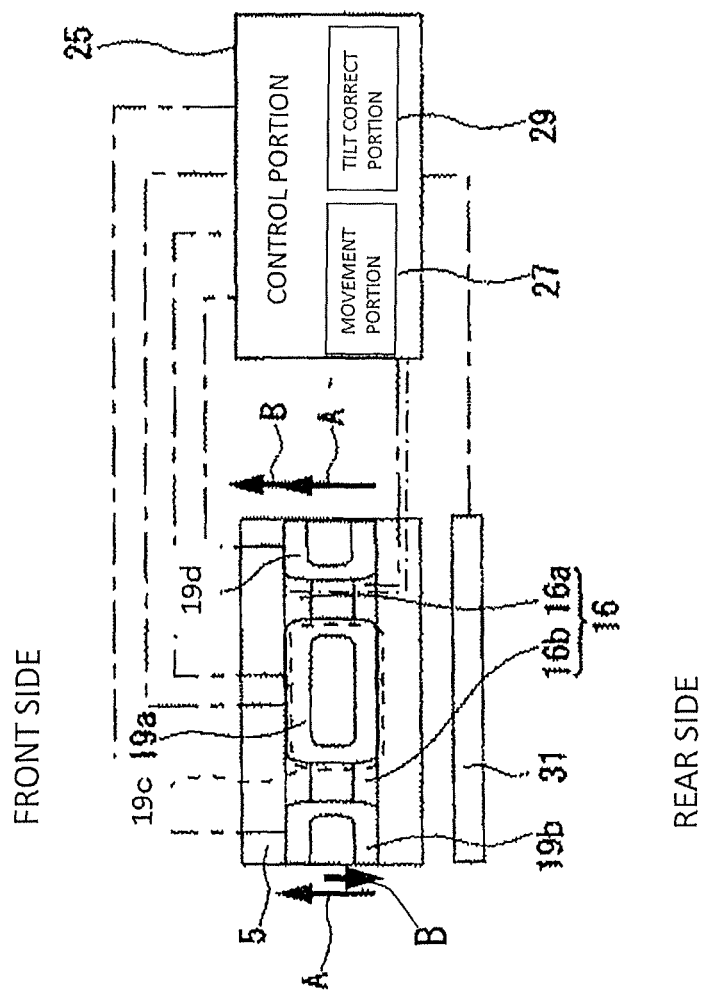
FIG. 4 is a block diagram illustrating the relationship between the lens support and the control portion in the one form of the lens driving device employed in the camera of an embodiment of the present invention.

The lens driving device 1 shown in FIG. 2 through FIG. 4 is the lens driving device for the autofocus camera that may be incorporated in any type of mobile phone or multifunction mobile phone, for example. For the convenience of description, the side on which an object is located will be referred to as the front side and the side on which the image sensor 31 is located will be referred to as the rear side when those sides are viewed from the lens driving device 1.

The lens driving device 1 shown in FIGS. 2 and 3 includes a yoke 3, a lens support 5, a frame 7, a base 8, a front side spring 9, a rear side spring 11, a front side spacer 14, and a rear side spacer 15.

In the example shown, the yoke 3 has the annular shape, and is fixedly disposed between the base 8 and the frame 7. The frame 7 and the front side spring 9 are arranged on the front side of the yoke 3 in the optical axis direction thereof, while the base 8 and the rear side spring 11 are arranged on the rear side of the yoke in the optical axis direction thereof. The front side spacer 14 is arranged between the front side spring 9 and the yoke 3, and the rear side spacer 15 is arranged between the rear side spring 11 and the yoke 3.

As shown in FIG. 3, the front side spring 9 has the flat plate shape in its original form (FIG. 2) in which it is not yet mounted as shown in FIG. 3. The front side spring 9 includes an outer circumferential portion 9*a*, an inner circumferential portion 9*b* located inside the outer circumferential portion 9*a*, and each of the arm portions 9*c* linking the outer circumferential portion 9*a* and the inner circumferential portion 9*b*. In the example shown, the outer circumferential portion 9*a* has the annular shape in the rectangular form as it is viewed in plane, and the inner circumferential portion 9*b* has the arc shape as it is viewed in plane.

Similarly, the rear side spring 11 has the flat plate shape in its original form (FIG. 2) in which it is not yet mounted as shown in FIG. 3. The rear side spring 11 includes an outer circumferential portion 11*a*, an inner circumferential portion 11*b* located inside the outer circumferential portion 11*b*, and each of the arm portions 11*c* linking the outer circumferential portion 11*a* and the inner circumferential portion 11*b*. In the example shown, the outer circumferential portion 11*a* has the annular shape in the rectangular form as it is view in plane, and the inner circumferential portion 11*b* has the arc shape when it is view in plane.

In the example shown, the yoke 3 has the substantially square tubular shape. The yoke 3 has four corners, to each of which a corresponding front side magnet 17*a* and a corresponding rear side magnet 17*b* are fixed on the inner circumferential side thereof. In the specification, the four front side magnets 17*a* and the four rear side magnets 17*b* may be referred to collectively as the magnets 17.

It may be apparent from the example shown that each of the front side magnets 17*a* and each of the rear side magnets 17*b* has the substantially triangular shape as it is viewed from its front side. It may also be apparent from the example shown that while the lens support 5 has the substantially cylindrical shape, each of the front side magnets 17*a* and each of the rear side magnets 17*b* has its inner circumferential side formed like the substantially arc shape that corresponds to the cylindrical shape of the lens support along the outer circumference of the lens support 5.

As shown in FIG. 3, each of the front side magnets 17*a* has its inner circumferential side that provides one polarity while each of the rear side magnets 17*b* has its inner circumferential side that provides the opposite polarity.

As it is apparent from the example shown, each of the four front side magnets 17*a* has its inner circumferential side that provides the N polarity and its outer circumferential side that provides the S polarity, while each of the four rear side magnets 17*b* has it inner circumferential side that provides the S polarity and its outer circumferential side that provides the N polarity.

In the example shown, the lens support 5 has the substantially cylindrical shape, and a lens (not shown) is fixed to the inner circumferential side of the lens support 5.

The lens support 5 has four projections 5*a* on its outer circumferential surface that extend toward the outer circumferential side thereof, those four projections 5*a* being provided at regular intervals in the circumferential direction.

The lens (not shown) fixed to the inner circumferential side of the lens support 5 receives light from an object located on the front side in FIG. 2, and causes the light to be focused upon the image sensor 31, the details of which will be described later.

The lens support 5 has a first coil 16 on its outer circumferential surface, the first coil 16 including a coil wound in the circumferential direction. As shown in FIG. 2, the first coil 16 includes a front side portion 16*a* and a rear side portion 16*b* which are separated from each other in the forward and backward directions. The coil in the front side portion 16*a* and the coil in the rear side portion 16*b* are wound in the respective directions opposed to each other, and are connected to each other.

The front side portion 16*a* and the rear side portion 16*b* that are included in the first coil 16 are separated from each other by means of the four projections 5*a* provided on the outer circumferential surface of the lens support 5.

As shown in FIG. 2 and FIG. 3, four second coils 19*a*, 19*b*, 19*c* and 19*d* are provided on the outer circumferential surface of the first coil 16 disposed on the outer circumferential surface of the lens support 5 so that they can be placed over the first coil 16. The second coils 19*a*, 19*b*, 19*c* and 19*d* are mounted at equal intervals in the circumferential direction. Each of the second coils 19*a*, 19*b*, 19*c* and 19*d* has the annular shape as it is viewed from its lateral side as shown in FIG. 2.

In the embodiment shown and described, the second coil 19*a* and the second coil 19*c* that are arranged diametrically symmetrically are connected in series. In addition, the second coil 19*a* and the second coil 19*c* are wound in the respective directions opposite to each other as they are viewed from the outer circumferential direction. Similarly, the second coil 19*b* and the second coil 19*d* that are arranged diametrically symmetrically are connected in series. In addition, the second coil 19*b* and the second coil 19*d* are wound from the directions opposite to each other as they are viewed in the outer circumferential direction.

Each of the second coils 19*a* to 19*d* has its rectangular front side edge 21 (FIG. 2) that is placed over the outer circumferential surface of the front side portion 16*a* of the first coil 16 (FIG. 3). Furthermore, each of them has its rear side edge 23 (FIG. 2) that is placed over the outer circumferential surface of the rear side portion 16*b* of the first coil 16 (FIG. 3).

Each of the second coils 19*a* to 19*d* has a ring-like hollow into which the projections 5*a* of the lens support 5 can be inserted. In this way, each of the second coils 19*a* to 19*d* can be held securely and positioned accurately.

As shown in FIG. 2, the lens driving device may be assembled and mounted in the following manner. That is, the rear side spring 11, the rear side spacer 15, the lens support 5 with the first coil 16 and the second coils 19*a* to 19*d* fixed to the outer circumferential surface, the yoke 3 with the four magnets 17 fixed to the inner side of each of the corners, the front side spacer 14, the front side spring 9 and the frame 7 can be assembled together and fixed to the base 8 in the sequence of the parts or elements listed above. The lens driving device will thus be completed as shown in FIG. 3.

In the state in which the lens driving device has been completed as shown in FIG. 3, the outer circumferential portion 9*a* of the front side spring 9 will be held securely between the frame 7 and the front side spacer 14, and the inner circumferential portion 9*b* will be fixed to the front end of the lens support 5. The outer circumferential portion 11*a* of the rear side spring 11 will be held securely between the base 8 and the rear side spacer 15, and the inner circumferential portion 11*b* may be fixed to the rear end of the lens support 5. In this way, the lens support 5 will be supported by the front side spring 9 and the rear side spring 11 so that it can be moved freely in the forward and backward directions (in the optical axis direction).

In the state in which the lens driving device has been completed as shown in FIG. 3, the inner circumferential side of each of the front side magnets 17a will be located so that it can face opposite the outer circumferential side of the front side edge 21 of each of the corresponding second coils 19a to 19d. Thus, the inner circumferential side of each of the front side magnets 17a will be located so that it can also face opposite the outer circumferential side of the front side portion 16a of the first coil 16 by holding the front side edge 21 securely therebetween.

In the state in which the lens driving device has been completed as shown in FIG. 3, the inner circumferential side of each of the rear side magnets 17b will also be located so that it can face opposite the outer circumferential side of the rear side edge 23 of each of the corresponding second coils 19a to 19d. Thus, the inner circumferential side of each of the rear side magnets 17b will be located so that it can also face opposite the outer circumferential side of the rear side portion 16b of the first coil 16 by holding the rear side edge 23 securely therebetween.

The first coil 16 and each of the second coils 19a to 19d have the respective input terminal and output terminal which are connected to a control portion 25 disposed inside the autofocus camera as shown in FIG. 4.

The control portion 25 is connected to the image sensor 31. The image sensor 31 is disposed on the image forming side of the lens (on the rear side in FIG. 3), and may be operated to receive light from any particular object and convert the light into corresponding electrical signals. The control portion 25 provides the functions for controlling the direct currents separately from each other so that those direct currents can flow through the first coil 16 and each of the second coils 19a to 19d. The control portion 25 includes a movement control 27 and a tilt correction control 29. The movement control 27 allows the later-described lens support 5 to be moved, and the tilt correction control 29 allows any tilt that may occur in the optical axis of the lens to be corrected as appropriate.

For example, the control portion 25 may be operated to apply force to the lens support 5 so that it can be moved in the optical axis direction (Z-axis direction), by flowing currents through the front side portion 16a and rear side portion 16b in the respective directions opposed to each other. In this way, the force for moving the lens support 5 in the direction A in FIG. 4 will be applied to the lens support 5 so that it can be moved forwardly up to the focal point position.

In addition, the control portion 25 may be operated to control the currents to be supplied to the second coil 19b and the second coil 19d arranged diametrically symmetrically and connected in series so that the currents can flow through those coils in the respective directions opposite to each other as they are viewed from the outer circumferential direction. In this way, the force will be produced so that it can allow the lens support 5 to be moved in the direction of arrow B in FIG. 4. Specifically, it will allow one end of the lens support 5 to be raised and the other end to be lowered. Any tilt will thus be corrected.

Similarly, the control portion 25 may be operated to control the currents to be supplied to the second coil 19a and the second coil 19c arranged diametrically symmetrically and connected in series so that the currents can flow through those coils in the respective directions opposite to each other as they are viewed from the outer circumferential direction. In this way, the force will be produced so that it can allow the lens support 5 to be moved in the direction of the arrow B in FIG. 4. Specifically, it will allow one end of the lens support 5 to be raised and the other end to be lowered. Any tilt will thus be corrected.

It may be understood from the above description that the control portion 25 provides the functions for receiving electrical signals from the image sensor 31 and for permitting the lens driving device 1 to respond to the electrical signals for correcting any tilt that may occur in the optical axis of the lens (not shown) fixed to the inner circumferential side of the lens support 5.

Any tilts of the optical axis of lens with respect to the image sensor 31 in the orthogonal directions with each other can be corrected accordingly.

Specifically, the control portion 25 may be operated to cause the lens driving device 1 to adjust any tilt that may occur in the optical axis of the lens (not shown) fixed to the inner circumferential side of the lens support 5, by controlling the values and directions of current flowing through the second coils 19a and 19c arranged diametrically symmetrically and through the second coils 19b and 19c arranged symmetrically in the direction orthogonal to the second coils 19a and 19c. Thus, the control portion 25 can be operated to adjust any tilts of the optical axis of lens with respect to the image sensor 31 in the orthogonal directions with each other.

Either of the second coil 19b and the second coil 19d will be raised and the other will be lowered. Thus, the lens support 5, which has been caused by the first coil 16 to move up to the focal point position will remain in the focal point position without being moved away from that focal point position.

Figure 5:
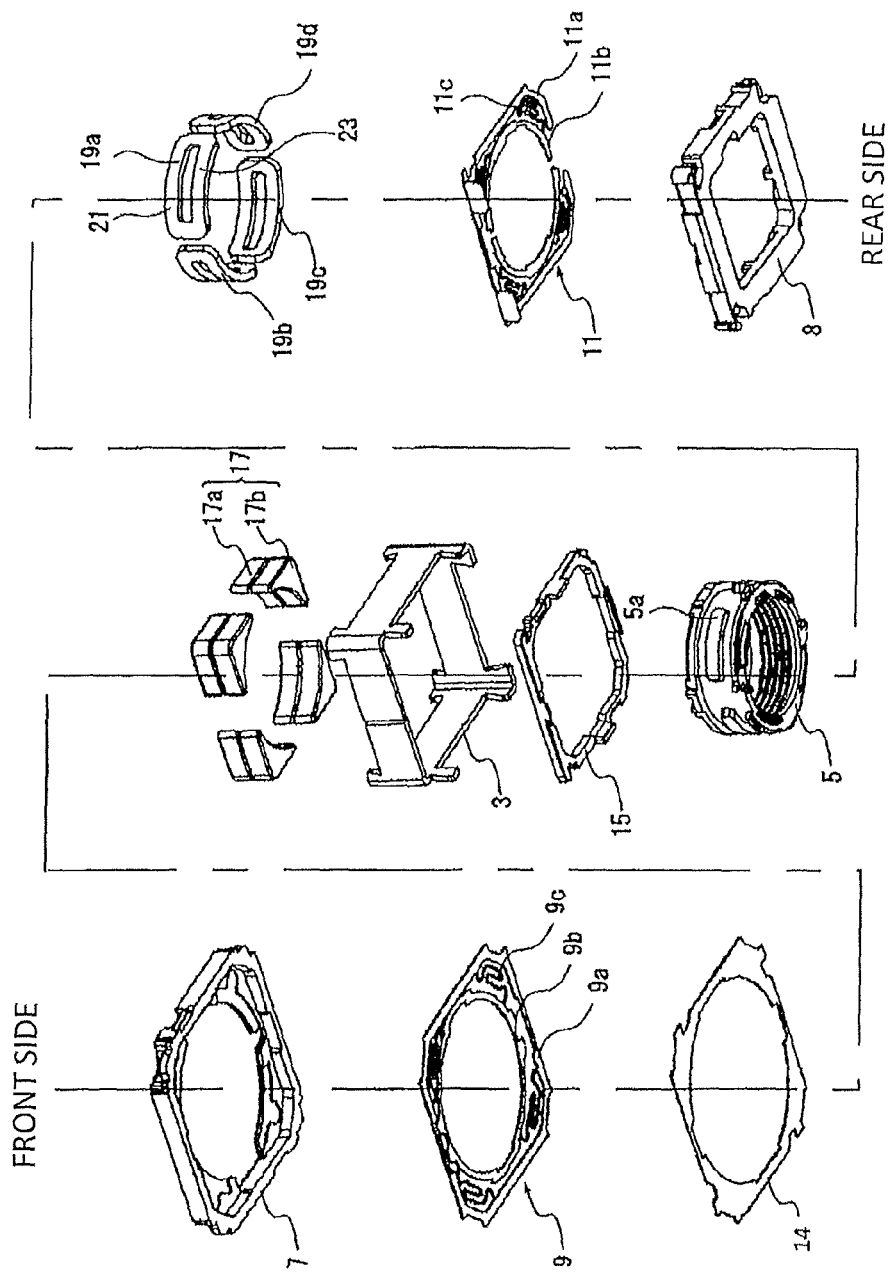
FIG. 5 is an exploded perspective view of another form of the lens driving device employed in the camera of an embodiment of the present invention.
Figure 6:
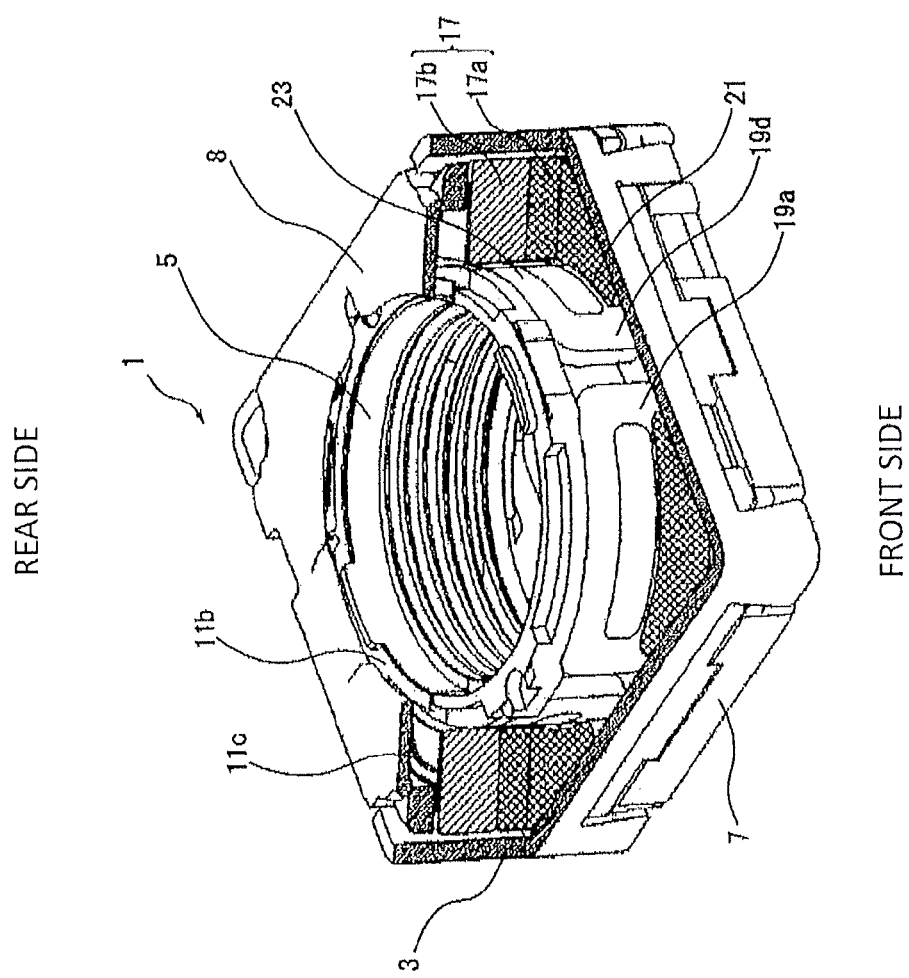
FIG. 6 is a partly cross-sectional perspective view of the other form of the lens driving device employed in the camera of an embodiment of the present invention.
Figure 7:
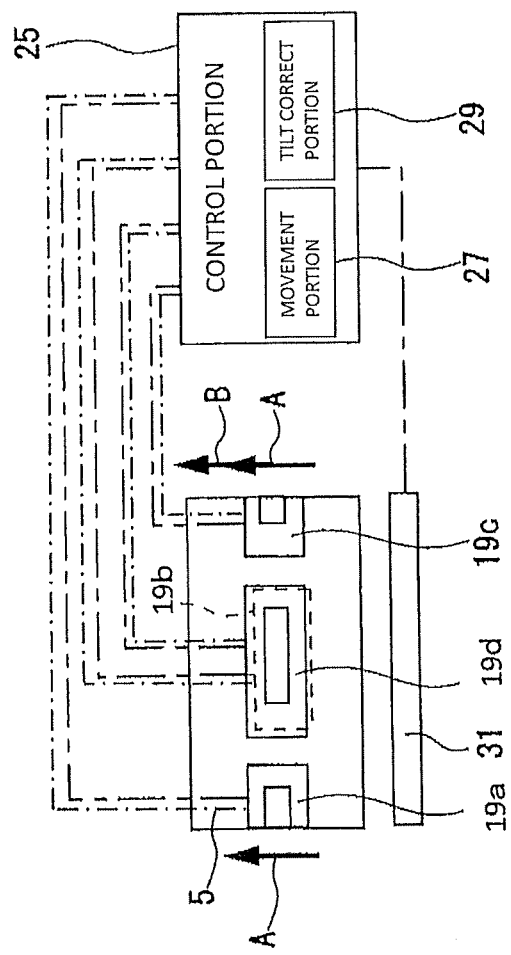
FIG. 7 is a block diagram illustrating the relationship between the lens support and the control portion in the other form of the lens driving device employed in the camera of an embodiment of the present invention.

Referring to FIG. 5 through FIG. 7, another form of the lens driving device, which is different from the lens driving device described above in FIG. 2 through FIG. 4 and can be used with the camera of the present invention, will be described below.

The lens driving device shown in FIG. 5 through FIG. 7 differs from the lens driving device shown and described in FIG. 2 through FIG. 4 in that it does not include the first coil 16.

Other parts or elements are similar to those for the lens driving device in FIG. 2 through FIG. 4. Those parts or elements which are common to those for the lens driving device in FIG. 2 through FIG. 4 are given like reference numerals and will not described therefore.

It should be noted that each of the second coils 19a to 19d in the lens driving device shown in FIG. 2 through FIG. 4 are wound independently of each other.

By enabling the control portion 25 to control the currents so that the same amount of current can flow through each of the second coils 19a to 19d, for example, the force that occurs in the optical axis direction as indicated by the arrow A in FIG. 7 will be applied to the lens support 5. In this way, the force that occurs in the direction as indicated by the arrow A in FIG. 7 will actually be applied to the lens support 5 so that the lens support 5 can be moved forwardly until it reaches the focal point position parallel with the image sensor 31.

Actually, there are different types of errors that may cause the tilt to occur. In this situation, therefore, the lens support 5 will not be moved in parallel with the image sensor 31 if no tilt is caused by such errors. That is, the lens support 5 will remain the same position.

If any tilt is caused by some errors, the tilt correction will be performed as described below.

When a large amount of current is flowed through the second coil 19c only, for example, the second coil 19c only will try to move largely as shown by the arrow B in addition to the movement as shown by the arrow A and described above. In this way, one end of the lens support 5 will be raised, and then the tilt correction will be performed.

Alternatively, the magnitude of the current flowing through the second coils 19*b* and 19*d* arranged diametrically symmetrically may be different from the magnitude of the current flowing through the second coils 19*a* and 19*c* arranged in the position that is orthogonal to the second coils 19*b* and 19*d*. For example, the magnitude of the current flowing through the second coil 19*a* may be smaller than the magnitude of the current flowing through the second coils 19*b* and 19*d*, and the magnitude of the current flowing through the second coil 19*c* may be larger than the magnitude of the current flowing through the second coils 19*b* and 19*d*. Even in this situation, one end of the lens support 5 will be raised and the other end will be lowered, the tilt correction will thus be performed.

For the lens driving device shown in FIG. 5 through FIG. 7, the control portion 25 may also be operated so that any tilts of the optical axis of lens with respect to the image sensor 31 in the orthogonal directions with each other can be corrected.

Figure 1:
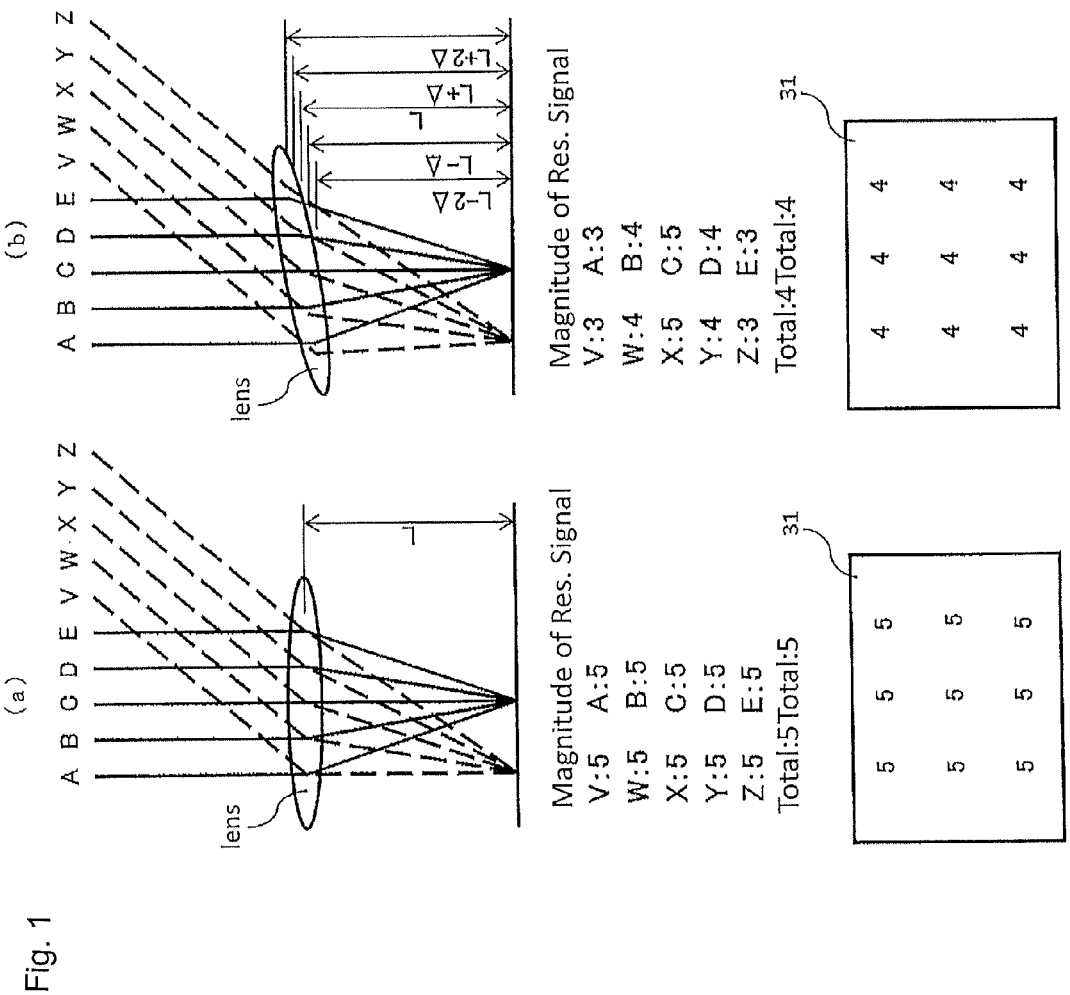
FIG. 1 (*a*), (*b*) is a concept diagram that is used to explain how any tile that may occur can be detected in accordance with an embodiment of the present invention.

FIG. 1 is a concept diagram that is used for explaining the tilt detecting mechanism employed by the present invention.

It is supposed that the lights A to E received from a particular front object and the lights V to Z received from another particular object that is located obliquely with respect to the front object will enter the image sensor 31 through the lens so that the image sensor 31 can convert those lights into corresponding electrical signals in response to those lights. It is also supposed that each of those lights A to E and V to Z will enter the lens at equal intervals.

In FIG. 1 (*a*), it is supposed that the lens is placed in parallel with the image sensor 31 and is spaced away from the image sensor 31 by the distance of L. It is also supposed that the distance of L represents the focal point.

In FIG. 1 (*b*), it is supposed that the lens is inclined with respect to the image sensor 31 and that the distances between each position of the lens through which the lights can enter the image sensor 31 and the image sensor 31 are equal to L−2Δ, L−Δ, L, L+Δ, and L+2Δ, respectively.

The lights A to E from the front object will pass through each of the corresponding points of the lens, and will be focused upon the particular points on the image sensor 31. The lights V to Z from the object located obliquely with respect to the front object will pass through each of the corresponding points of the lens, and will be focused upon the different points on the image sensor 31. Thus, the lights that enter the image sensor 31 represent the sum of the lights that enter the image sensor 31 from each of those points of the lens.

Here, the resolution signals thus obtained may be used as a parameter that allows any lens tilt to be determined. The resolution signal is the signal that indicates the degree of the focal point which may be expressed in terms of the contrast value in the high tone range and the like, for example. For the simplicity of explanation, it is supposed that the resolution signal may be determined by the distance between the lens and the image sensor 31.

In FIG. 1 (*a*), it is assumed that the resolution signal has the magnitude of "5", for example, when the light C is received from a front object. Because the lens and the image sensor 31 are kept in parallel with each other, the corresponding resolution signals also have the magnitude of "5" when other lights A, B, D and E are received from the same front object. This means that the corresponding resolution signals will also have the magnitude of "5" when those lights A to E are summed up.

Similarly, it is assumed that the resolution signal also has the magnitude of "5" when a light X is received from an object located obliquely with respect to the front object, since the distance between the lens and the image sensor 31 is L. The corresponding resolution signals will also have the magnitude of "5" when other lights V, W, Y and Z are received from the same object located obliquely with respect to the front object.

As described above, the resolution signal has the magnitude of "5" when the light C is received from the front object, since the distance between the lens and the image sensor 31 is L. In FIG. 1 (*b*), however, the corresponding resolution signals will have the magnitude of "4" and "3", for example, when the light B and the light A are received, since the respective distances between the lens and the image sensor 31 become smaller such as L−Δ and L−2Δ. Similarly, the corresponding resolution signals will have the magnitude of "4" and "3", for example, when the light D and the light E are received, since the respective distances between the lens and the image sensor 31 become greater such as L+Δ and L+2Δ. It follows from the above that the corresponding resolution signals can have the magnitude of "4" when the lights A to E are received from the front object.

It may be appreciated from FIG. 1 (*b*) that the corresponding resolution signals will also have the magnitude of "4" when the lights V to Z are received from the object located obliquely with respect to the front object. This means that if there is any tilt in the optical axis of the lens, the corresponding resolution signals may have the magnitude that depends on the degree of any tilt that may occur. It can be said, therefore, that the magnitude of the resulting resolution signals may become smaller regardless of the location of the image sensor 31.

For the case of FIG. 1 (*a*), the corresponding respective resolution signals for the lights in the center area (one area) and the peripheral areas (eight areas) on the image sensor 31 will have the maximum magnitude of "5".

For the case of FIG. 1 (*b*), on the other hand, the corresponding respective resolution signals for the lights in the center area (one area) and the peripheral areas (eight areas) on the image sensor 31 will have the magnitude of "4", which means that the magnitude will become smaller than the maximum value of "5".

Then, considering the magnitude of the resolution signal for the light in the particular one point on the image sensor 31 without considering the direction of any tilts of the optical axis of lens with respect to the image sensor 31, the tilt correction may be performed under control of the control portion 25 so that the maximal resolution signal that occurs at the particular one point can be obtained.

Figure 10:
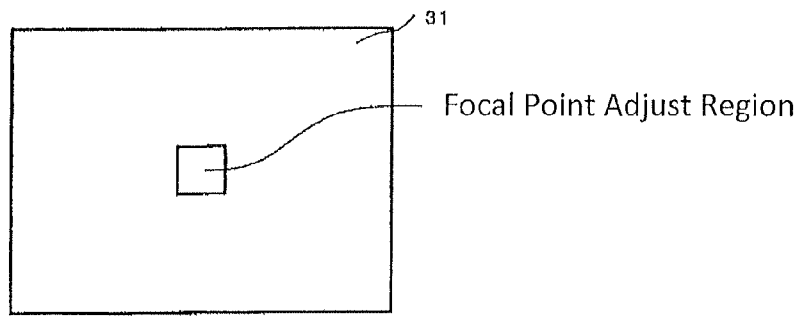
FIG. 10 is a diagram that is used to explain the positions where the corresponding resolution signals can be derived for correcting any tilt that may occur in the optical axis with respect to the image sensor, in which (*a*) represents the center area where the image sensor is located, (*b*) represents the position of the image sensor that corresponds to the position of the human face as recognized, and (*c*) represents the center area and peripheral areas of the image sensor where the corresponding resolution signals are derived.
Figure 10:
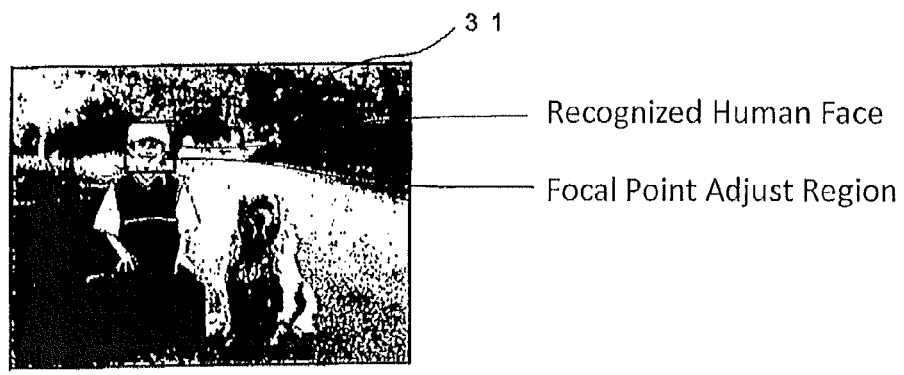
Figure 10:
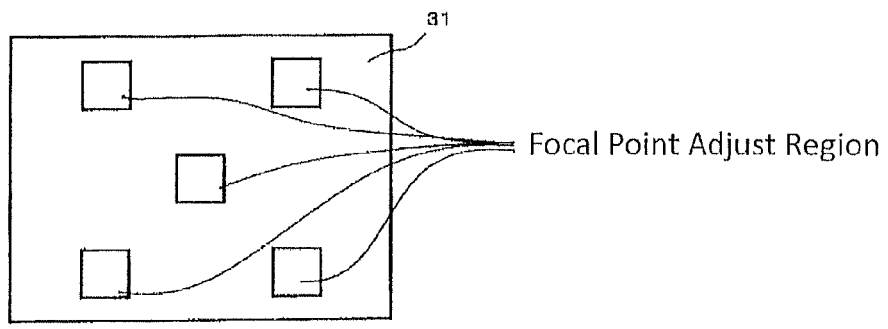

The particular one point to be noted can be the center area on the image sensor 31 which may be represented as the "focal point adjusting region" as shown in FIG. 10 (*a*), for example. Alternatively, it may be the center area of the image sensor 31 which is represented as the "focal point adjusting region" in FIG. 10 (*c*) or any one of the peripheral areas of the image sensor 31 that surround the center area of the image sensor 31 as shown.

Alternatively, the resolution signals that may be obtained at the five areas represented as the "focal point adjusting region" as shown in FIG. 10 (*c*) may be averaged by the control portion 25, and the tilt correction may occur under control of the control portion 25 as described above so that the resulting average value can be maximized.

Following the step in which the control portion 25 is operated to control so that the resolution signal that occurs at the particular one point on the image sensor 31 can be maximized as described above, the human face will be recognized and if the tilt correction is required, it will be performed by the control portion 25 so that the resolution signal can be obtained at the location of the image sensor 31 that corresponds to the location of the recognized human face.

In accordance with the autofocus camera of the present invention, any tilt that may occur in the optical axis of the lens with respect to the image sensor 31 can be adjusted by using the resolution signals (focusing signals) that can be obtained at the particular locations of the image sensor 31. There is no need of adding any additional new sensors that may be required for restraining and correcting such tilt. From this respect, therefore, the present invention can meet the requirements of making the autofocus camera as small as possible.

As the autofocus camera of the present invention can be made smaller, the electronic devises such as mobile phones, multi-function mobile phones and the like on which the autofocus camera of the present invention is mounted can also be made smaller accordingly.

In the embodiment shown and described above, the lens driving device 1 is used for the VCM. Alternatively, the lens driving device 1 may be used for other driving motors such as the driving motor using the piezoelectric element.

In the lens driving device 1 shown in FIG. 2 through FIG. 4, it is preferred that the second coils 19a to 19d are connected to the control portion 25 independently of each other and that currents are flowed through those second coils separately from each other.

Figure 8:
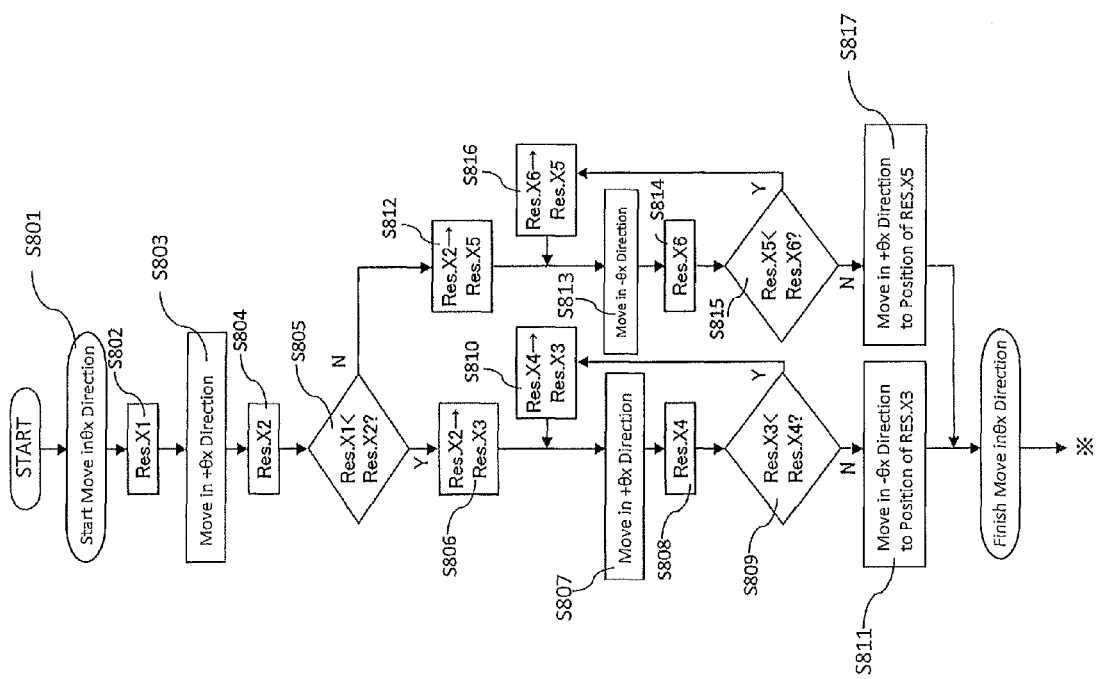
FIG. 8 is a flow diagram that explains one example of the tilt correction that is performed in the camera of an embodiment of the present invention.
Figure 9:
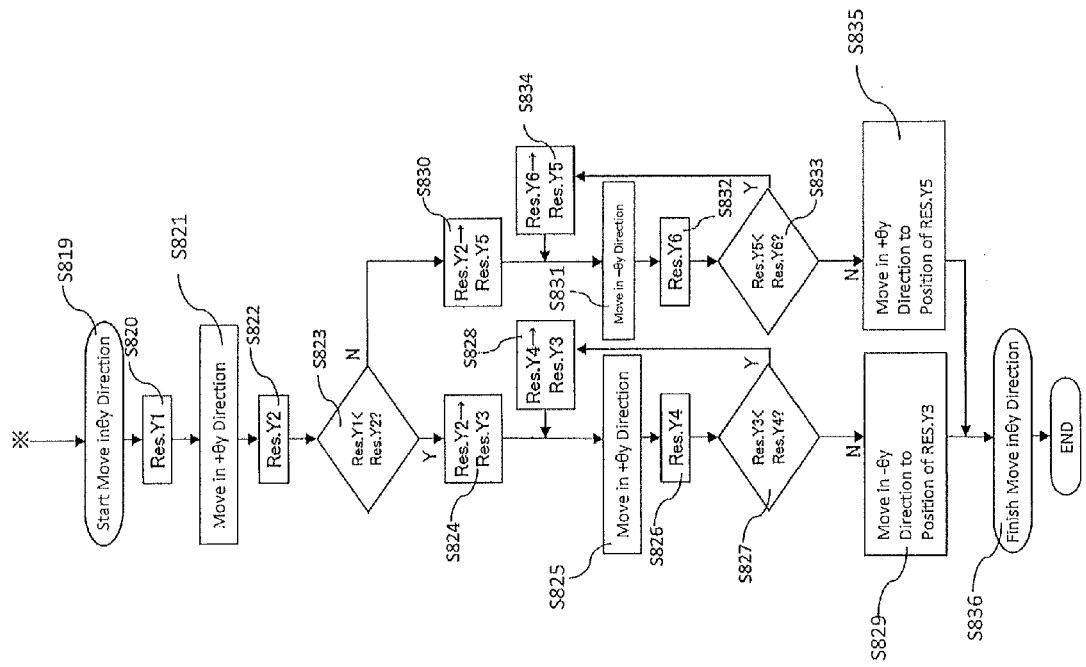
FIG. 9 is a flow diagram that is used to explain the steps that are preformed following the tilt correcting steps in FIG. 8.

The following description, which will be provided by referring to FIG. 8 and FIG. 9, concerns the embodiment in which the tilt correction occurs for the autofocus camera of the present invention on which the lens driving device 1 shown in FIG. 2 through FIG. 4 is mounted.

It should be understood that the present invention is not limited to the embodiment shown and described above as well as the embodiment that will be described below. Rather, the present invention may be modified in numerous ways without departing from the spirit and scope of the invention as defined in the appended claims.

Embodiment

As a preliminary step, the control portion 25 is operated to control the lens support 5 so that the lens support 5 can be moved to the appropriate focal point position by conducting electric currents to flow through the first coil 16. Then, the control portion 25 proceeds to the step in which the second coils 19a,19c, for example, are selected from the second coils 19a, 19c and the second coils 19b, 19d arranged orthogonally to each other, and the adjustment by those second coils 19a, 19c is commenced (the θx direction is supposed) (S801).

Firstly, a resolution signal X1 in the center area of the image sensor 31 is obtained (S802).

Next, the second coils 19a, 19c that have been selected are energized so that the lens support 5 can be moved in the direction of +θx (thereby the lens support 5 is to be tilted) (S803) and a resolution signal X2 in the center area of the image sensor 31 can be obtained at the position where the lens support 5 has been moved (S804).

The resolution signal X1 and the resolution signal X2 are compared (S805). If X1<X2, it is determined that the two resolution signals agree with each other in the direction of +θx so that the lens support 5 is continued to move in the direction +θx (thereby the lens support 5 is continued to tilt further). At the first, the resolution signal X2, which was obtained at step S804, is replaced with a resolution signal X3 by the process conducted by the control portion 25 (S806), then, the lens support 5 is moved in the direction of +θx (S807), and a resolution signal X4 in the center area of the image sensor 31 is obtained at the position where the lens support 5 has been moved (S808).

Then, the resolution signal X3 and the resolution signal X4 are compared (S809).

If X3<X4, the resolution signal X4 is replaced with the resolution signal X3 by the process conducted by the control portion 25 (S810), and then, the lens support 5 is continued to move further in the direction of +θx again (S807), the resolution signal X4 in the center area of the image sensor 31 is obtained again at the position where the lens support 5 has been moved (S808), and the resolution signal X3 and the resolution signal X4 are compared again (S809).

If X3>X4, this means that the resolution signals have passed the peak so that the lens support 5 is moved in the direction −θx and is moved back to the position where the resolution signal X3 has been obtained, which is the position that the resolution signal X4 was obtained at the before described step S808 (S811).

This also means that the resolution signal X3, which is the resolution signal obtained at the before described step S808 as the resolution signal X4, represents the maximum resolution signal so that the lens support 5 is moved back to the position where the resolution signal X3, which is the resolution signal obtained at the before described step S808 as the resolution signal X4, has been obtained. Then, the movement of the lens support 5 in the direction of θx is finished (S818).

In the manner described above, the lens support 5 will be moved in the direction of θx up to the position where the maximum resolution signal can be obtained.

If it is found by comparing the resolution signals X1 and X2 that X1<X2, the lens support 5 will be moved in the X2 that X1<X2, the lens support 5 will be moved in the direction of +θx, which means that the magnitude of the resolution signal will become smaller. This also means that the lens support 5 must be moved backwardly in the direction of −θx so that the lens support 5 must be tilted toward opposite direction which the lens support 5 is tilted by the moving of the lens support 5 in the direction of +θx.

After the resolution signals X1 and X2 have been compared in the above case, the resolution signal X2 is replaced with the resolution signal X5 by the process conducted by the control portion 25 (S812), the lens support 5 is moved in the direction of −θx (S813), and the resolution signal X6 in the center area of the image sensor 31 is obtained at the position where the lens support 5 has been moved (S814).

Then, the resolution signals X5 and X6 are compared (S815).

If it is found by comparing the resolution signals X5 and X6 (S815) that X5<X6, the resolution signal X6 is replaced with the resolution signal X5 by the process conducted by the control portion 25 (S816), the lens support 5 is moved further in the direction of −θx again (S813), the resolution signal X6 in the center area of the image sensor 31 is obtained at the position where the lens support 5 has been moved (S814), and the resolution signals X5 and X6 are compared (S815).

If X5>X6, this means that the resolution signals have passed the peak so that the lens support 5 is moved in the direction +θx and is then moved back to the position where the resolution signal X5, which is the resolution signal obtained at the before described step S814 as the resolution signal X6, has been obtained.

This also means that the resolution signal X5, which is the resolution signal obtained at the before described step S814 as the resolution signal X6, represents the maximum resolution signal and so the lens support 5 is moved back to the position where the maximum resolution signal has been obtained. The movement of the lens support 5 in the direction of θx is then finished (S818).

In the manner described above, the lens support 5 is moved in the direction of θx until it reaches the position where the maximum resolution signal can be obtained.

Next, the control portion 25 goes to the step in which the second coils 19b, 19d, for example, are selected from the second coils 19a, 19c and the second coils 19b, 19d arranged orthogonally to each other, and the adjustment by those second coils 19b, 19d is commenced (the θy direction is supposed) (S819)

Firstly, the resolution signal Y1 in the center area of the image sensor 31 is obtained (S820).

Next, electric currents are conducted to flow through the second coils 19b, 19d so that the lens support 5 can be moved in the direction of +θy (thereby the lens support 5 is to be tilted) (S821), and the resolution signal Y2 in the center area of the image sensor 31 is obtained at the position where the lens support 5 has been moved (S822).

If it is found by comparing the resolution signals Y1 and Y2 (S823) that Y1<Y2, it is determined that those resolution signals agree with each other in the +θy direction and so the lens support 5 is continued to move in the direction (thereby the lens support 5 is continued to tilt further). Firstly, the resolution signal Y2, which was obtained at step S822, is replaced with a resolution signal Y3 by the process conducted the control portion 25 (S824), the lens support 5 is moved in the direction of +θy (S825), and the resolution signal Y4 in the center area of the image sensor 31 is obtained at the position where the lens support 5 has been moved (S826).

Then, the resolution signals Y3 and Y4 are compared (S827).

If Y3<Y4, the resolution signal Y4, which was obtained at step S826, is replaced with a resolution signal Y3 by the process conducted by the control portion 25 (S828), the lens support 5 is moved further in the direction of +θy again (S825), the resolution signal Y4 in the center area of the image sensor 31 is obtained at the position where the lens support 5 has been moved (S826), and the resolution signals Y3 and Y4 are compared (S827).

If Y3>Y4, this means that the resolution signal has passed its peak so that the lens support 5 is moved in the direction of −θy and is then moved back to the position where the resolution signal Y3, which is the resolution signal obtained at the before described step S826 as the resolution signal Y4, has been obtained (S829).

This also means that the resolution signal Y3, which is the resolution signal obtained at the before described step S826 as the resolution signal Y4, represents the maximum resolution signal and so the lens support 5 is moved back to that position. The movement of the lens support 5 in the direction of θy is then finished (S836).

In the manner described above, the lens support 5 will be moved in the direction of θy until it reaches the position where the maximum resolution signal can be obtained.

If it is found by comparing the resolution signals Y1 and Y2 that Y1>Y2, on the other hand, this means that the lens support 5 is moved in the direction of +θy, causing the magnitude of the resolution signal to have become smaller. Therefore, the lens support 5 must be moved backwardly in the direction −θy so that the lens support 5 must be tilted toward opposite direction which the lens support 5 is tilted by the moving of the lens support 5 in the direction of +θy.

After the resolution signals Y1 and Y2 have been compared in the above situation, the resolution signal Y2 is replaced with the resolution signal Y5 by the process conducted by the control portion 25 (S830), the lens support 5 is moved in the direction of −θy (S831), and the resolution signal Y6 in the center area of the image sensor 31 is obtained at the position where the lens support 5 has been moved (S832).

Then, the resolution signals Y5 and Y6 are compared (S833).

If it is found by comparing the resolution signals Y5 and Y6 that Y5<Y6, the resolution signal Y6 is replaced with the resolution signal Y5 by the process conducted by the control portion 25 (S834), the lens support 5 is moved further in the direction of −θy again (S831), the resolution signal Y6 in the center area of the image sensor 31 is obtained at the position where the lens support 5 has been moved (S832), and the resolution signals Y5 and Y6 are compared (S833).

If Y5>Y6, this means that the resolution signal has passed its peak, causing the lens support 5 to be moved in the direction of +θy so that it can be moved back to the position where the resolution signal Y5, which is the resolution signal obtained at the before described step S832 as the resolution signal Y6, has been obtained.

This means that the resolution signal Y5, which is the resolution signal obtained at the before described step S832 as the resolution signal Y6, represents the maximum resolution signal, and the lens support 5 is moved back to that position. The movement of the lens support 5 in the direction of θy is then finished (S836).

In the manner described above, the lens support 5 is moved in the direction of θy until it reaches the position where the maximum resolution signal can be obtained.

It may be understood from the foregoing description that the control portion 25 may correct any tilts of the optical axis with respect to the image sensor 31 in the directions of θx and θy, orthogonal direction with each other so that the resolution signal in the center area of the image sensor 31 can be maximized.

Although the resolution signals that occur in the center area of the image sensor 31 are referenced and controlled by the control portion 25 in accordance with the embodiment described above, it should be appreciated that resolutions signals that may occur in other areas such as the peripheral areas of the image sensor 31 may also be referenced and controlled by the control portion 25.

What is claimed is:

1. An autofocus camera comprising:
    an image sensor configured to receive light from an object and convert the light into corresponding electrical signals;
    a lens driving device having a lens configured to focus the light from the object upon said image sensor; and
    a control portion configured to cause said lens driving device to adjust tilt that may occur in the optical axis of the lens in response to the electrical signals received from said image sensor, wherein said control portion is operated to cause said lens driving device to adjust tilts of the optical axis with respect to the image sensor in the orthogonal directions with each other, so that resolution signals at predetermined areas of said image sensor are maximized,
    wherein said lens driving device includes a driving motor configured to drive said lens,
    wherein said driving motor includes a lens support to which said lens is fixed, coils provided on an outer circumference of said lens support and magnets facing opposite an outer circumference of said coils,
    wherein said coils include a first coil which includes at least a front side portion being configured to receive a current when moving said lens support along the optical axis or a rear side portion being configured to receive a current when moving said lens support along the optical axis, wherein said coils include at least four second coils disposed on the outer circumference of said lens support at equal intervals in a circumferential direction, each of the at least four second coils having an annular shape as viewed from a lateral side of the lens support, wherein said tilts of the optical axis are corrected by supplying currents to the second coils, wherein two of the second coils are arranged diametrically symmetrically, connected to each other, and wound in respective directions opposite to each other as viewed from the outer circumferential direction, wherein said tilts of the optical axis are corrected by supplying currents to the two of the second coils such that the currents supplied to the two of the second coils flow in the respective opposite directions of winding of the two of the second coils, and wherein another two of the second coils are arranged diametrically symmetrically, connected to each other, and wound in respective directions opposite to each other as viewed from the outer circumferential direction, wherein said tilts of the optical axis are corrected by supplying currents to the other two of the second coils such that the currents supplied to the other two of the second coils flow in the respective opposite directions of winding of the other two of the second coils.

2. An autofocus camera comprising:

an image sensor configured to receive light from an object and convert the light into corresponding electrical signals;

a lens driving device including a lens configured to focus the light from the object upon the image sensor, and a driving motor configured to drive the lens; and a control portion configured to cause the driving motor of the lens driving device to adjust tilt that may occur in the optical axis of the lens in response to the electrical signals received from the image sensor, wherein the control portion is configured to determine an average value obtained by averaging resolution signals obtained at a plurality of areas of the image sensor, and is configured to cause the driving motor of the lens driving device to adjust tilts of the optical axis with respect to the image sensor in the orthogonal directions with each other, so that the average value is maximized, wherein said driving motor includes a lens support to which said lens is fixed, coils provided on an outer circumference of said lens support and magnets facing opposite an outer circumference of said coils, wherein said coils include a first coil which includes at least a front side portion being configured to receive a current when moving said lens support along the optical axis or a rear side portion being configured to receive a current when moving said lens support along the optical axis, wherein said coils include at least four second coils disposed on the outer circumference of said lens support at equal intervals in a circumferential direction, each of the at least four second coils having an annular shape as viewed from a lateral side of the lens support, wherein said tilts of the optical axis are corrected by supplying currents to the second coils, wherein two of the second coils are arranged diametrically symmetrically, connected to each other, and wound in respective directions opposite to each other as viewed from the outer circumferential direction, wherein said tilts of the optical axis are corrected by supplying currents to the two of the second coils such that the currents supplied to the two of the second coils flow in the respective opposite directions of winding of the two of the second coils, and wherein another two of the second coils are arranged diametrically symmetrically, connected to each other, and wound in respective directions opposite to each other as viewed from the outer circumferential direction, wherein said tilts of the optical axis are corrected by supplying currents to the other two of the second coils such that the currents supplied to the other two of the second coils flow in the respective opposite directions of winding of the other two of the second coils.

3. An electronic device on which the autofocus camera as defined in claim 1 is mounted.

4. An electronic device on which the autofocus camera as defined in claim 2 is mounted.

5. An autofocus camera comprising:

an image sensor configured to receive light from an object and convert the light into corresponding electrical signals;

a lens driving device having a lens configured to focus the light from the object upon said image sensor; and a control portion configured to cause said lens driving device to adjust tilt that may occur in the optical axis of the lens in response to the electrical signals received from said image sensor, wherein said control portion is operated to cause said lens driving device to adjust tilts of the optical axis with respect to the image sensor in the orthogonal directions with each other, so that a resolution signal at a predetermined one area of said image sensor smaller than a whole of said image sensor is maximized, wherein said lens driving device includes a driving motor configured to drive said lens, wherein said driving motor includes a lens support to which said lens is fixed, coils provided on an outer circumference of said lens support and magnets facing opposite an outer circumference of said coils, wherein said coils include a first coil which includes at least a front side portion being configured to receive a current when moving said lens support along the optical axis or a rear side portion being configured to receive a current when moving said lens support along the optical axis, wherein said coils include at least four second coils disposed on the outer circumference of said lens support at equal intervals in a circumferential direction, each of the at least four second coils having an annular shape as viewed from a lateral side of the lens support, wherein said tilts of the optical axis are corrected by supplying currents to the second coils, wherein two of the second coils are arranged diametrically symmetrically, connected to each other, and wound in respective directions opposite to each other as viewed from the outer circumferential direction, wherein said tilts of the optical axis are corrected by supplying currents to the two of the second coils such that the currents supplied to the two of the second coils flow in the respective opposite directions of winding of the two of the second coils, and wherein another two of the second coils are arranged diametrically symmetrically, connected to each other, and wound in respective directions opposite to each other as viewed from the outer circumferential direction, wherein said tilts of the optical axis are corrected by supplying currents to the other two of the second coils such that the currents supplied to the other two of the second coils flow in the respective opposite directions of winding of the other two of the second coils.

6. An electronic device on which the autofocus camera as defined in claim 5 is mounted.

* * * * *